United States Patent [19]

Rispoli et al.

[11] 4,308,294

[45] Dec. 29, 1981

[54] OIL REPLACEMENT COMPOSITION

[75] Inventors: Joseph M. Rispoli, Massepequa Park; Jatinder P. Sabhlok, Yorktown Heights; Allen S. Ho, Flushing; Bryan G. Scherer, Carmel; Carmine Giuliano, Hartsdale, all of N.Y.

[73] Assignee: General Foods Corporation, White Plains, N.Y.

[21] Appl. No.: 161,471

[22] Filed: Jun. 20, 1980

[51] Int. Cl.³ .................. A23D 3/00; A23J 3/00; A23L 1/24; A23L 1/34

[52] U.S. Cl. .................. 426/564; 426/567; 426/575; 426/576; 426/577; 426/578; 426/656; 426/657; 426/603; 426/613

[58] Field of Search ............ 426/103, 565, 567, 568, 426/573, 575, 576, 578, 583, 657, 656, 661, 564, 577, 603, 613

[56] References Cited

U.S. PATENT DOCUMENTS

| | | | |
|---|---|---|---|
| 2,170,417 | 8/1939 | Levin | 426/2 |
| 2,217,699 | 10/1940 | Musher | 426/564 |
| 2,876,107 | 3/1959 | Jucaitis et al. | 426/548 |
| 2,916,384 | 12/1959 | Bondi et al. | 426/548 |
| 2,924,530 | 2/1960 | Levin | 426/116 |
| 2,944,906 | 7/1960 | Spitzer et al. | 426/605 |
| 3,355,300 | 11/1967 | Avedikian et al. | 426/546 |
| 3,510,316 | 5/1970 | Decker | 426/565 |
| 3,554,764 | 1/1971 | Yoder et al. | 426/573 |
| 3,556,813 | 1/1971 | Creswick | 426/567 |
| 3,809,764 | 5/1974 | Gabby et al. | 426/565 |
| 4,012,533 | 3/1977 | Jonas | 426/565 |
| 4,140,808 | 2/1979 | Jonson | 426/583 |
| 4,169,854 | 10/1979 | Igoe | 426/573 |
| 4,216,242 | 8/1980 | Braverman | 426/578 X |

OTHER PUBLICATIONS

Belshaw, F., "New Product Line, New Package Concept," Food Product Dev., Jul. 1978, pp. 22, 23.

"Functional Soy Protein," Food Processing, Jul. 1978, pp. 53, 54.

*Primary Examiner*—Robert A. Yoncoskie
*Attorney, Agent, or Firm*—Mitchell D. Bittman

[57] ABSTRACT

An oil-free, oil-replacement composition having an oily mouthfeel, texture and lubricity is prepared by: forming a protein phase by hydrating and whipping a protein and a cellulose gum; forming an acid phase by hydrating an acid stable modified starch and an acid, then heating to swell the starch while minimizing bursting, followed by cooling; and mixing the protein phase and acid phase.

23 Claims, No Drawings

OIL REPLACEMENT COMPOSITION

BACKGROUND OF THE INVENTION

This invention relates to the production of an oil-replacement composition. More particularly this invention relates to preparing a composition which is oil-free, but possesses an oily mouthfeel, texture and lubricity and can be used as a partial or full replacement for oil in food products such as salad dressings (e.g. mayonnaise, etc.), desserts (e.g. toppings, aerated desserts, frozen desserts such as ice cream), margarine, etc.

The food art has for a long period of time been searching for a means of reducing or eliminating the oil in a variety of food products which contain oil for the taste, texture and appearance imparted by the oil. The drive behind this inquiry has been dietetic, cost, as well as health considerations. While the art has developed a number of products (e.g. salad dressings) which are low in oil or oil-free, these products generally lack an oily texture and do not possess the lubricity of an oil. The approach generally taken by the art was to utilize a specific blend of hydrocolloid gums (e.g. xanthan gum, guar gum etc.) to impart a smooth texture, a desired viscosity and cloudy appearance, but the resultant product still generally lacked the oily texture and lubricity.

It is a feature of this invention to prepare a composition which can be used as a full or partial replacement for oil.

It is a further feature of this invention to prepare a composition which is oil-free, but possesses an oily mouthfeel, texture and lubricity.

SUMMARY OF THE INVENTION

Briefly, the features of this invention are accomplished by first, blending and hydrating a protein and a cellulose gum, then whipping the protein blend. Second, blending and hydrating an acid stable modified starch and an acid, heating and mixing the acid blend to swell the starch, then cooling the acid blend. Then the whipped protein blend and the acid blend are mixed together with continuous agitation to obtain the oil-replacement composition. Preferably an acid stable hydrocolloid and a salt are mixed into the protein blend and/or the acid blend in amounts effective to obtain a desired viscosity. The resultant oil-replacement composition surprisingly possesses an oily mouthfeel and texture, as well as possessing a capacity to reduce friction (lubricity).

DETAILED DESCRIPTION OF THE INVENTION

This invention, by critically processing the specified ingredients, is able to prepare a composition which unexpectedly simulates the properties and characteristics of an oil, without any oil present. While some of the specified ingredients may have previously been used individually in products such as salad dressings, it is the combination of these ingredients which interact under the critical processing of the separate phases to provide a stable composition which is smooth, continuous and with a slippery and oily mouthfeel and texture, as well as lubricity of an oil. When the specified ingredients are processed in a single phase (without separate phases) the resultant composition is unstable and has a gritty, non-homogenous and lumpy texture, without any oily characteristics.

First a protein blend is formed by blending and hydrating a protein and a cellulose gum, followed by whipping the protein blend. The protein-cellulose gum blend is critical in that there is some sort of interaction between the protein and cellulose gum and it is theorized that a protein-cellulose gum complex is formed which is responsible for producing the desired lubricity in combination with the other ingredients in the composition. However, this is only intended as a theory and the invention is not to be limited thereto. Sufficient water is added to completely disperse and hydrate the ingredients. Whipping is carried out to ensure complete hydration, dispersion and/or solution of the ingredients and to incorporate air to decrease the density of the protein blend to 0.9 gm/cm$^3$ or lower, preferably 0.7 gm/cm$^3$ or lower. The incorporation of small air bubbles are stabilized in the composition and aid the development of a creamy, smooth and oily texture in the resultant composition.

The protein is of a type which interacts and/or bonds with the gum under acidic conditions. Suitable proteins include egg protein, soy protein, whey protein (acid whey or sweet whey) and casein (e.g. sodium caseinate). The protein is generally employed at levels within the range of 0.5 to 30% by weight of the composition, with the preferred levels being adjusted for the particular protein depending upon its effectiveness in the composition. The preferred proteins are egg protein and whey protein due to the high lubricity imparted by these proteins in the resultant composition. Egg protein (e.g. egg white protein) is preferably employed at levels of 0.5 to 20% by weight and optimally at levels of 1 to 7% by weight of the composition, to impart the optimum lubricity and oily mouthfeel. Whey protein (e.g. acid whey) is preferably employed at levels of 1 to 12% by weight of the composition to impart the optimum lubricity and oily mouthfeel.

The cellulose gum is a cellulose derivative (e.g. a cellulose ether or a microcrystalline cellulose) which interacts with the protein under acidic conditions. Suitable cellulose gums include hydroxypropyl cellulose, hydroxymethyl cellulose and microcrystalline cellulose, with the preferred cellulose gum being sodium carboxymethyl cellulose due to its ability to interact with the protein. The cellulose gum is generally employed at levels of 0.01 to 5% by weight, preferably 0.1 to 1.5% by weight of the composition.

Second, a separate acid blend is formed by blending and hydrating an acid stable modified starch and an amount of acid effective to impart a pH of 3 to 6 to the resultant composition. Then the acid blend is heated and mixed to disperse the acid and starch and to swell the starch while minimizing bursting or rupturing of the starch units, followed by cooling the heated acid blend.

The acid blend is heated and mixed to swell the starch while minimizing bursting. When the starch is ungelatinized this means heating to fully gelatinize the starch granules while minimizing bursting, and when the starch is pregelatinized as starch granules (e.g. spray dried), agglomerates or sheets (e.g. drum dried), this means minimal heating to swell and hydrate the starch units while minimizing bursting. Overcooking, which ruptures the starch units (e.g. granules or agglomerates), is undesireable as the resultant composition is lumpy with a sandy and gritty taste, while insufficient heating does not gelatinize, disperse and swell (hydrate) the starch granules sufficiently resulting in a separation of phases and lack of an oily texture. Preferably the acid stable modified starch is ungelatinized and thus must be heated to a temperature (e.g. greater than 160° F., 70° C. for cornstarch) and for a period of time sufficient to uniformly gelatinize but not rupture the starch granules. When the starch is pregelatinized, sufficient heat and mixing need be employed to fully hydrate and swell the starch. Suitable modifications of the starch include a crosslinked and acetylated starch and a propoxylated starch, while suitable starch sources include corn, waxy maize, tapioca, etc. Generally, the modified starch is incorporated at a level of 3 to 25% by weight of the composition, and preferably 5 to 12% by weight of the composition.

The acid is present in an amount effective to impart a pH of 3 to 6, preferably 3.5 to 5, to the resultant composition. Suitable acids include acetic acid, citric acid, malic acid, phosphoric acid and lactic acid. As this pH range is at or near the isoelectric point of the protein, it aids in stabilizing the composition and imparting the viscosity and oily texture. In the acid-starch blend, the starch is able to slow the release of the acid to the protein when the acid blend and the protein blend are combined, preventing the phases from separating out and promoting stability of the composition.

The acid blend is mixed to ensure complete hydration and dispersion of the starch and acid, and may be whipped to incorporate air which aids the formation of an oily texture and mouthfeel. The acid blend is then cooled to prevent overcooking of the starch and to enable the acid blend and protein blend to be mixed together without coagulation of the protein, preferably the acid blend is cooled to a temperature of 125° F. (52° C.) or below.

To impart a desired viscosity and body to the composition, preferably an acid stable hydrocolloid and a salt are added to the protein blend and/or the acid blend. Suitable hydrocolloids include xanthan gum, locust bean gum, low methoxyl pectin, carrageenan, gelatin, and guar gum and generally the hydrocolloid is incorporated at levels within the range of 0.05 to 3% by weight of the composition. The desired viscosity, which is important in the perception of an oily texture and mouthfeel, is within the range of about 30,000 to 100,000 centipoise (when measured at 40° F., 4° C.). A salt, for example chloride salts such as NaCl, KCl and $CaCl_2$ or phosphates, carbonates, sulfates, etc, have also been found to be desireable in contributing to the desired viscosity in combination with the hydrocolloid, and is generally employed at levels within the range of 0.5 to 20% by weight of the composition.

Additionally, for taste and viscosity, a soluble carbohydrate is preferably added to the protein blend and/or the acid blend. Suitable carbohydrates include sugar (sucrose, fructose, etc), dextrin, corn syrup solids, etc, and is generally employed at levels within the range of 0 to 30% by weight of the composition. Additional ingredients can include flavoring agents (e.g. aspartame, saccharin etc.), spices, colors (e.g. $TiO_2$), preservatives etc.

Third, the whipped protein blend and the acid blend are mixed together with continuous agitation to obtain the oil-replacement composition. It is theorized that the protein and cellulose gum form a complex which precipitates slowly due to the acid and coats the swelled starch units (granules, agglomerates) thereby lubricating them and imparting an oily texture, mouthfeel and lubricity to the composition. However, this is only intended as a theory and this invention is not limited thereto. The air bubbles stabilized within the composition also aid in imparting the oily texture and mouthfeel. The additional preferred ingredients, i.e. hydrocolloids, salt and carbohydrates, are desired for taste, viscosity and body.

The oil-replacement composition may then be cooled for storage or further processed into the desired final product as a full or partial replacement of oil (includes fat). The composition has extended stability, e.g. 3 months at 40° F. (4° C.), without separation of phases and while maintaining its oily texture, mouthfeel and lubricity. Once formed the oil replacement composition may be used in any final product regardless of the pH, and may be processed in preparing the final product as an oil would be. Suitable final products include salad dressings (e.g. mayonnaise), desserts (toppings, frozen desserts, aerated desserts), margarine, etc.

To measure the lubricity of the oil-replacement composition the standard method of measurement of extreme-pressure properties of lubricating grease (Four-Ball Method) as approved by the American National Standards Institute, Committee D-2 on Petroleum Products and Lubricants (effective 1969, designation D2596-69) was used. Standard test conditions included a load weight of 40 Kg, an r.p.m. of 1200, a temperature of 27°±8° C. and a time of 60 minutes, where modified slightly to decrease the load weight to 20 kilograms. The lower the resultant scar diameter measurement indicates a higher lubricating effect or ability to reduce friction (lubricity) of the lubricant.

EXAMPLE I

An oil-replacement composition was prepared containing the following ingredients in each blend:

| Ingredient | Percent by Weight |
|---|---|
| Protein Blend | |
| Water | 14.0 |
| Egg White Solids | 3.4 |
| Sugar (sucrose) | 1.9 |
| Carboxymethylcellulose | 0.2 |
| Xanthan Gum | 0.1 |
| Acid Blend | |
| Water | 57.4 |
| Vinegar (100 grain) | 6.2 |
| Sugar | 6.1 |
| Modified Ungelantinized Corn Starch (Blend of a propoxylated starch with a crosslinked and acetylated starch) | 7.0 |
| Salt (NaCL) | 3.3 |
| $TiO_2$ | 0.4 |

The dry ingredients of the protein blend were mixed into water and let stand for ten minutes. The blend was wire whipped to completely hydrate the ingredients and reduce the density to 0.7 gm/cm$^3$.

The dry ingredients of the acid blend were mixed into water and vinegar in a steam jacketed Hobart. The blend was heated to 180° F. (82° C.) with continuous agitation and mixing to fully gelatinize the starch while minimizing bursting, then cooled to 120° F. (49° C.).

The whipped protein blend and the acid blend were mixed together with continuous agitation to form the oil-replacement composition, then cooled to 90° F. (32° C.).

| Physical Data | |
| --- | --- |
| Viscosity (cps) at 42° F. (6° C.) | 42,000 |
| pH | 3.96 |
| Scar Diameter (Four-Ball Method) | 0.87 |

The oil-replacement composition possessed an oily texture and mouthfeel. The lubricity was similar to oil and resulted in a scar diameter of 0.87 as compared to vegetable oil which had a scar diameter of 0.40. The composition was smooth, continuous and had extended shelf stability (3 months at 40° F., 4° C.).

EXAMPLE II

An oil-replacement composition was prepared containing the following ingredients with whey protein as the protein source:

| Ingredient | Percent by Weight |
| --- | --- |
| Protein Blend | |
| Water | 13.6 |
| Sugar (sucrose) | 1.9 |
| Whey Protein | 6.6 |
| Carboxymethylcellulose | 0.2 |
| Xanthan Gum | 0.1 |
| Acid Blend | |
| Water | 55.6 |
| Vinegar (100 grain) | 6.0 |
| Sugar | 6.0 |
| Salt (NaCL) | 3.2 |
| Modified Ungelantinized Corn Starch (Blend of a propoxylated starch with a crosslinked and acetylated starch) | 6.8 |

The ingredients of the protein blend were mixed with water followed by whipping to hydrate the ingredients and incorporate small air bubbles to reduce the density to about 0.8 gm/cm³. The ingredients of the acid blend were mixed into water and vineger then heated to 180° F. (82° C.) while being mixed to gelatinize the starch but without substantial rupturing of the starch granules, then cooled to 120° F. (49° C.). The protein and acid blends were then mixed together with continuous agitation to form the oil-replacement composition, followed by cooling to 90° F. (32° C.).

| Physical Data | |
| --- | --- |
| Viscosity (cps) at 42° F. (6° C.) | 39,000 |
| pH | 3.85 |
| Scar Diameter (Four-Ball Method) | 0.87 |

The oil-replacement composition was smooth, continuous and possessed an oily mouthfeel, texture and lubricity. The composition also possessed extended storage stability in that the phases did not separate and maintained their oily characteristics over time (3 months at 40° F., 4° C.).

EXAMPLE III

An oil replacement composition was prepared as in Example I except 0.1 percent by weight of low methoxyl pectin was substituted for the xanthan gum. The resultant composition had a viscosity of 42,000 cps, was smooth, continuous and possessed an oily mouthfeel, texture and lubricity.

EXAMPLE IV

A French bottled salad dressing was prepared with the oil replacement composition of Example I containing the following ingredients:

| Ingredient | Percent by Weight |
| --- | --- |
| Water | 40.3 |
| Oil-Replacement Composition | 19.9 |
| Sugar (sucrose) | 15.0 |
| Vinegar (100 grain) | 12.0 |
| Malto-dextrin | 4.4 |
| Salt (NaCL) | 3.0 |
| Modified Corn Starch | 2.0 |
| Seasonings | 3.0 |
| Color | 0.1 |
| Preservatives | 0.2 |
| Gum Arabic | 0.1 |

The water, vinegar and oil replacement composition are blended. The dry ingredients are blended and then mixed into the liquids, followed by transferring the mix to a colloid mill where the mix is homogenized thoroughly. The homogenized mix is then heated to 180° F. (82° C.) while being mixed in a steamjacketed Hobart Mixer, followed by cooling to 80° F. (27° C.). The mix is dearated then bottled and sealed.

The resultant oil-free French dressing has the oily taste, texture and mouthfeel of an French dressing which contains oil. Without the oil-replacement composition the French dressing had a scar diameter (Four-Ball Method with 40 Kg load) of 1.26, while the oil-replacement composition the French dressing had a scar diameter of 1.05 demonstrating the increased lubricity imparted by the oil-replacement composition.

EXAMPLE V

The oil replacement composition of Example I was used as a partial replacement for the fat in margarine by mixing 25 grams of the oil replacement composition with 75 grams of margarine, followed by whipping to the desired texture. The resultant margarine had the characteristics of regular margarine, i.e. creamy, fat taste and texture, ability to pan fry, melted on toast etc.

EXAMPLE VI

The oil replacement composition of Example I was used to totally replace fat in an imitation ice cream containing the following ingredients:

| Ingredient | Percent by Weight |
| --- | --- |
| Water | 71.7 |
| Oil-Replacement Composition | 5.2 |
| Sugar (sucrose and corn syrup solids) | 18.1 |
| Casein | 2.5 |
| Glycerine | 0.8 |
| Egg White Solids | 0.5 |
| Gums | 0.6 |
| Salt | 0.3 |
| Flavor | 0.3 |

The water and casein are blended followed by adding the oil replacement composition. During heating the remaining ingredients are added and mixed in, followed by pasteurizing, homogenizing, cooling and freezing the mix in ice cream making equipment.

The resultant frozen dessert had a creamy and smooth taste and mouthfeel similar to ice cream containing butterfat.

What is claimed:

1. Process for preparing an oil-replacement composition comprising:
   (a) blending and hydrating 0.5 to 30% of a protein by weight of the composition and 0.01 to 5% of a cellulose gum by weight of the composition;
   (b) whipping the protein blend to incorporate air and decrease the density to 0.9 gm/cm$^3$ or lower;
   (c) blending and hydrating 3 to 25% of an acid stable modified starch by weight of the composition and an amount of an acid effective to obtain a pH of 3 to 6 in the oil-replacement composition;
   (d) heating and mixing the acid blend to disperse the acid and the starch, and to swell the starch while minimizing rupturing of the starch units;
   (e) cooling the acid blend to prevent overcooking of the starch and to prevent coagulation of the protein during subsequent mixing; and
   (f) mixing together the whipped protein blend and the acid blend of (b) and (e) with continuous agitation to obtain the oil-replacement composition.

2. Process of claim 1 wherein an acid stable hydrocolloid and a salt are blended with the protein blend and, or the acid blend, in an amount effective to obtain a viscosity of 30,000 to 100,000 centipoise when measured at 40° F. in the oil-replacement composition.

3. Process of claim 2 wherein the protein is selected from the group consisting of egg protein, soy protein, whey protein and casein.

4. Process of claim 3 wherein the protein is egg protein in an amount ranging from about 0.5 to 20% by weight of the oil-replacement composition.

5. Process of claim 4 wherein the amount of egg protein ranges from 1 to 7% by weight of the composition.

6. Process of claim 3 wherein the protein is whey protein.

7. Process of claim 6 wherein the amount of whey protein ranges from 1 to 12% weight of the composition.

8. Process of claim 1 or 3 wherein the acid is chosen from the group consisting of acetic acid, citric acid, and malic acid.

9. Process of claim 3 further comprising a soluble carbohydrate which is blended with the protein blend and/or the acid blend at a level of from 1 to 30% by weight of the composition.

10. Process of claim 9 wherein the soluble carbohydrate is chosen from the group consisting of sugar, dextrin, and corn syrup solids.

11. Process of claim 2 wherein the acid stable hydrocolloid is chosen from the group consisting of xanthan gum, low methoxyl pectin, carrageenan, gelatin and guar gum.

12. Process of claim 3 wherein the cellulose gum is chosen from the group consisting of hydroxypropyl cellulose, hydroxymethyl cellulose, microcrystalline cellulose and carboxymethyl cellulose.

13. Process of claim 1 wherein the starch is ungelatinized and is heated to a temperature and for a period of time effective to gelatinize the starch.

14. Process of claim 13 wherein the starch is pregelatinized.

15. Process of claim 13 or 14 wherein the modified starch is chosen from the group consisting of a crosslinked and acetylated starch and a propoxylated starch.

16. Process of claim 1 wherein the acid blend is cooled to below 125° F.

17. Process of claim 8 wherein the amount of acid is effective to obtain a pH of 3.5 to 5.

18. Product prepared by the process of claims 1, 2, 3, 5, 7, 9, 11, 13 or 14.

19. A dessert wherein the oil replacement composition prepared by the process of claims 1, 2, or 9 is fully or partially substituted for the oil.

20. The dessert of claim 9 wherein the dessert is a frozen dessert.

21. The dessert of claim 19 wherein the dessert is an aerated dessert.

22. A margarine wherein the oil replacement composition prepared by the process of claim 1, 2, or 9 is fully or partially substituted for the oil.

23. A salad dressing wherein the oil replacement composition prepared by the process of claim 1, 2, or 9 is fully or partially substituted for the oil.

* * * * *